UNITED STATES PATENT OFFICE.

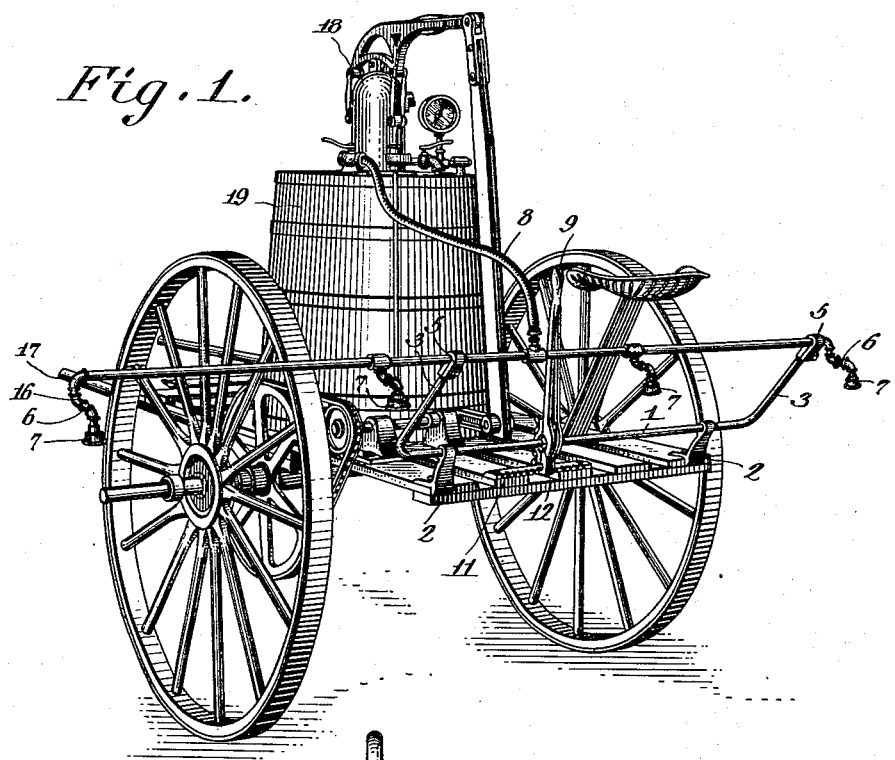

JOHN F. SCHOELLES, OF ELMIRA, NEW YORK, ASSIGNOR TO FIELD FORCE PUMP COMPANY, OF ELMIRA, NEW YORK.

SPRAYING APPARATUS.

999,676.  Specification of Letters Patent.  Patented Aug. 1, 1911.

Application filed January 25, 1910. Serial No. 540,075.

*To all whom it may concern:*

Be it known that I, JOHN F. SCHOELLES, a citizen of the United States, residing at Elmira, in the county of Chemung and State of New York, have invented certain new and useful Improvements in Spraying Apparatus, of which the following is a specification.

This invention relates to improvements in apparatus for distributing liquid poisons and the like by spraying the liquid over growing plants; and the object of my invention is to provide, (in combination with a vehicle carrying a supply tank and a forcing apparatus), a distributing pipe and nozzles so arranged as to be readily adjustable both vertically and longitudinally, whereby the nozzles may be properly positioned over the rows of plants.

I attain my object by constructing the apparatus in the manner illustrated in the accompanying drawings, in which—

Figure 1 presents a rear perspective view of the complete apparatus; and Fig. 2, a detail on a larger scale showing a side elevation, partly in section, of the spraying pipe and its supporting frame, the spraying pipe being shown sectioned at a point adjacent the right hand supporting arm 3 in Fig. 1.

Like numerals designate like parts in the two views.

At the rear of the vehicle, as herein illustrated, a transverse bar 1 of round steel is mounted to both turn and slide in the brackets 2, 2, fastened to the bottom of the vehicle frame. At each end, the bar is bent at right angles to form arms 3, 3. At the ends of the arms of the doubly movable frame thus formed, the distributing pipe 4 is fastened by means of clamps 5, and at suitable intervals this pipe is provided, by offset T and elbow connections, with lateral extensions 6, to which the spraying nozzles 7 are attached in a pendant position. The distributing pipe is connected to the tank 19 by a flexible pipe or hose 8, through which connection the liquid is forced from the tank by any suitable apparatus, as, for instance, by means of air pressure produced by means of a pump 18 driven by the vehicle itself when drawn over the ground.

Upon the bar 1 is fastened a lever 9 in a convenient position for operating it; it being shown in Fig. 1 positioned within reach of the driver's seat. At its lower end the lever 9 is provided with a downwardly projecting finger 10, adapted to engage a toothed bar 11 fastened to the vehicle frame. By throwing the lever 9 forward, thereby releasing it from engagement with the toothed bar, the bar 1, and with it the distributing pipe and nozzles, may be shifted to the right or left to position the nozzles properly over the rows of plants, as the vehicle moves along between rows; the weight of the distributing pipe at the ends of the supporting arms 3 causing the lever to be thrown back into engagement with the toothed bar, and retained in such engagement, when the lever is released.

In this type of sprayer it is also necessary to provide means for adjusting the height of the nozzles to both low and high growing plants. To attain such adjustment I fasten upon the bar 1 a collar 12, having serrations around its outer periphery. The serrated part of this collar is positioned in an eye formed in part by the lever 9 and in part by a removable cap 13 bolted to the lever. This cap is provided with a tooth 14 to engage the serrations on the collar 12, and the bolts by which the cap is fastened to the lever are provided with thumb nuts 15, whereby the cap may be readily loosened so that the collar and with it the bar 1 may be turned in the eye of the lever thus formed. By this means the arms 3 may be turned and fastened at any desired angle, thereby raising or lowering the distributing pipe 4 to properly adjust the spraying nozzles as to their height above the ground.

By loosening the clamps 5 at the ends of the arms the pipe 4 may be turned so as to position the extensions 6 horizontally at whatever angle the arms 3 may be set, thus maintaining the nozzles 7 in vertical spraying position. Or, if it be desired to throw the spray from the nozzles at an angle to the vertical, the distributing pipe may be turned and fastened in the desired angular adjustment.

As shown in Fig. 1 the distributing pipe is so fastened upon the arms 3 as to project to one side beyond the left hand wheel of the vehicle. By loosening the clamps 5, however, the distributing pipe may be set centrally upon the vehicle, or may be thrown out to the opposite side, according to requirements.

As the rows of plants may be set at different distances apart, I provide a still further adjustment by means of which the several nozzles may be moved toward or away from one another, respectively. Thus, by turning the extensions 6 to the right or left upon their offset connections with the distributing pipe 4, as, for instance, by turning the elbow 16 on its connection with the elbow 17 by which the offset is formed, it will be evident that the nozzles may be readily set nearer to or farther apart from one another, and so properly distanced from one another to correspond with different spacing or irregularities in the setting of the plant rows.

It will thus be seen that I provide a simple and effective means whereby the distributing nozzles may be readily adjusted, both horizontally and vertically to meet all the requirements to be met with in the use of this type of spraying apparatus.

What I claim as my invention and desire to secure by Letters Patent is—

1. The combination, with a liquid forcing apparatus, of a flexible connecting pipe leading therefrom, a horizontal distributing pipe provided with a plurality of spraying nozzles coupled to said connecting pipe, a bar parallel to said pipe mounted in bearings attached to the apparatus and adapted to slide and turn in said bearings, arms projecting from said bar upon the ends of which the distributing pipe is fastened, a hand-lever attached to said bar, a toothed bar fastened to the apparatus parallel to said bar, and means on the lever for engaging the toothed bar.

2. The combination, with a liquid forcing apparatus, of a flexible connecting pipe leading therefrom, a horizontal distributing pipe provided with a plurality of spraying nozzles coupled to said connecting pipe, a bar parallel to said pipe mounted in bearings attached to the apparatus and adapted to slide and turn in said bearings, arms projecting from said bar and provided upon their ends with clamps in which the distributing pipe is fastened for angular adjustment, a hand-lever adapted to be fastened in angular adjustment on said bar, a toothed bar fastened to the apparatus parallel to said bar, and means on the lever for engaging the toothed bar.

3. The combination, with a liquid forcing apparatus, of a horizontal distributing pipe provided with a plurality of spraying nozzles, a flexible connecting pipe between the distributing pipe and the apparatus, a parallel bar having arms bent at right angles thereto and provided with clamps upon their ends, in which clamps the distributing pipe is fastened for angular adjustment, bearings on the apparatus in which the bar is slidably and rotatively mounted, a collar fastened to the bar and provided with serrations around its periphery, a hand lever having an eye encircling the collar provided with a tooth or teeth adapted to engage said serrations, part of said eye being formed by a removable cap piece, a toothed bar fastened to the apparatus parallel to said parallel bar, and a finger projecting from the lever to engage the teeth of said bar.

In testimony whereof I have affixed my signature, in presence of two witnesses.

JOHN F. SCHOELLES.

Witnesses:
H. S. CHAPMAN,
R. C. PIERCE.